United States Patent [19]

Betts

[11] Patent Number: 5,373,388

[45] Date of Patent: Dec. 13, 1994

[54] AC COUPLED FIBER OPTIC RECEIVER WITH DC COUPLED CHARACTERISTICS

[75] Inventor: Robert Betts, Vestal, N.Y.

[73] Assignee: International Business Machines, Inc., Armonk, N.Y.

[21] Appl. No.: 23,018

[22] Filed: Feb. 25, 1993

[51] Int. Cl.[5] ............................................. H04B 10/06
[52] U.S. Cl. ...................................... 359/189; 375/76
[58] Field of Search ................. 359/189, 194, 195; 341/144, 69, 71, 50; 307/494; 375/76

[56] References Cited

U.S. PATENT DOCUMENTS

| 3,757,132 | 9/1973 | Nilsson | 375/76 |
| 4,375,037 | 2/1983 | Ikushima | 375/76 |
| 4,431,916 | 2/1984 | Couch | 250/214 R |
| 5,175,748 | 12/1992 | Takahashi | 375/76 |

*Primary Examiner*—Richard E. Chilcot, Jr.
*Assistant Examiner*—Rafael Bacares
*Attorney, Agent, or Firm*—William H. Steinberg; Bernard Tiegerman

[57] ABSTRACT

An AC-coupled receiver is provided which allows data with long periods of no signal sent on a fiber optic bus to be received without the normally required preamble. The receiver provides a voltage signal which is AC-coupled to one side of a differential amplifier with a delayed voltage signal AC-coupled to the other input of the differential amplifier. If the time constant of the AC coupling network is much longer than the signal baud time, low-frequency variations at the two inputs of the differential amplifier will be nearly identical and the low frequency signals will effectively cancel each other.

7 Claims, 2 Drawing Sheets

AC COUPLED FIBER OPTIC RECEIVER WITH DC COUPLED CHARACTERISTICS

BACKGROUND OF THE INVENTION

The present invention relates to AC-coupled fiber optic receivers and more particularly to an AC-coupled fiber optic receivers that do not require message preambles for proper operation.

Optical receivers translate pulses of optical energy into equivalent electrical signals. The optical pulses produce small currents in a photosensitive semiconductor, which are amplified and processed by electronic circuits to produce an electrical signal that duplicates the optical pulses.

The signals can be of two general types: DC-coupled and AC-coupled. DC-coupled circuits respond to the magnitude of the optical signals no matter how much time elapses between signal transitions. These circuits are always prepared to translate the magnitude of the optical input to a high or low logic value. This feature is desirable when processing data that comes in unpredictable bursts. The major disadvantage of DC-coupled circuits is that their signals drift with temperature and age. They are especially difficult to use when high amplification is necessary.

Most optical receivers use AC-coupled circuits which cannot respond to signals that change too slowly. AC-coupled circuits do not suffer the disadvantages of signal drift with temperature and age that the DC-coupled circuits are subject to, but the AC-coupled circuits are not always prepared to process data. AC circuits need time to settle and stabilize after the input signal begins before they can properly interpret the data. To compensate for this characteristic of AC-coupled receivers, data is prefixed with a "preamble" string of pulses that prepares the receiver to receive data.

It is an object of the present invention to provide an AC-coupled fiber optic receiver that does not require a preamble before the data to be processed.

It is another object of the present invention to provide an AC-coupled fiber optic receiver that is easy to use with any two-level data format independent of the time between optical signal transitions.

It is a further object of the present invention to provide an AC-coupled fiber optic receiver with an increased signal to noise ratio.

SUMMARY OF THE INVENTION

In one aspect of the present invention an AC-coupled receiver for extracting a digital signal from a digitally encoded analog signal is provided. A first AC coupling network couples the analog signal to the first input of a differential amplifier. A delay means is coupled to the analog signal and provides a delayed analog signal, the delay time being short relative to the baud time of the analog signal. A second AC coupling network couples the output of the delay means to the second input of the differential amplifier. A comparator means is coupled to the output of the differential amplifier through a third AC coupling means for providing a digital signal. The time constants of the coupling networks are long relative to the baud time of the analog signal.

In another aspect of the present invention an AC-coupled fiber optic receiver is provided. A preamplifier means is coupled to a fiber optic signal and provides an analog voltage signal representation of the optical signal. A first AC coupling network couples the analog voltage signal to the first input of a differential amplifier. A delay means is coupled to the analog voltage signal and provides a delayed analog voltage signal, the delay time being short relative to the baud time of the fiber optic signal. A second AC coupling network couples the output of the delay means to the second input of the differential amplifier. A comparator means is coupled to the output of the differential amplifier through a third AC coupling means for providing a digital signal. The time constants of the coupling networks are long relative to the baud time of the fiber optic signal.

DETAILED DESCRIPTION OF THE INVENTION

Figure 1:
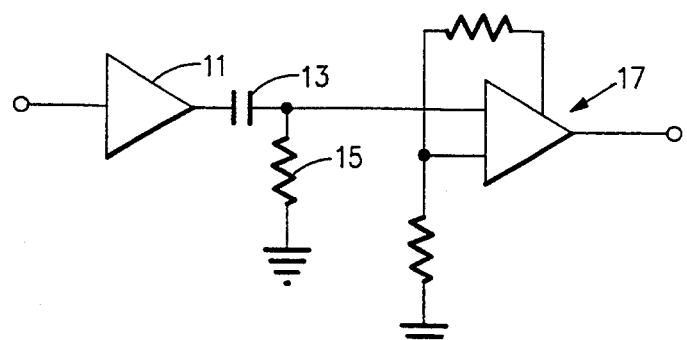
FIG. 1 is schematic representation of a prior art AC-coupled receiver which passively differentiates the electrical equivalent of an optical input signal.
Figure 2A:
FIGS. 2A, 2B, and 2C are voltage waveform diagrams on a common time scale which show the waveforms expected at the output of the preamplifier, the two inputs to the comparator, and the output of the comparator, respectively, of FIG. 1.
Figure 2B:
Figure 2C:

Referring now to the drawing and particularly FIGS. 1 and 2 thereof, a prior art AC-coupled fiber optic receiver schematic circuit and associated voltage waveform diagrams are shown. A preamplifier 11 receives an optical signal. An electrical equivalent provided by the preamplifier 11 is passively differentiated by a passive differentiator comprising a capacitor 13 in series with resistor 15 connected to ground to detect transitions in the signal. The differentiator is a high pass filter that limits the lower bound of the receiver's bandwidth. The output waveform of the preamplifier is shown in FIG. 2A and the waveform of the differentiated signals at the junction of the capacitor 13 and resistor 15 shown in FIG. 2B by the waveform with the solid line indicated by reference 16. The time constant of the passive differentiator is short relative to the baud time of the signal. Positive pulses are produced from rising transitions of the input signal and negative pulses from the falling transitions of the input signal. The differentiated signal is fed to a comparator 17 that changes state whenever a transition occurs. Comparator output feedback, the voltage waveform of which is shown in FIG. 2B as the waveform with the dashed line and indicated by reference numeral 18, changes the threshold from positive to negative, to positive. The output of the comparator is one polarity during low-to-high transitions, and it is the opposite polarity during high-to-low transitions. The output of comparator 17 is shown in the waveform of FIG. 2C, and represents the electrical logic output of the receiver which duplicates the optical pulses.

A problem with this approach occurs when the rise and fall times of the optical signal are slow relative to the baud time. The amplitude of the differentiated signal becomes very low, especially when the differentiated signal must decay to a small fraction of its peak at the end of the baud time. The transition times of the input signal to the circuit must be short, which requires faster optical transitions and higher frequency cutoff in the preamplifier. The higher frequency cut-off allows more receiver noise with the signal. This can seriously degrade the signal to noise ratio at the receiver's output, and thus, increase the bit error rate.

Figure 3:
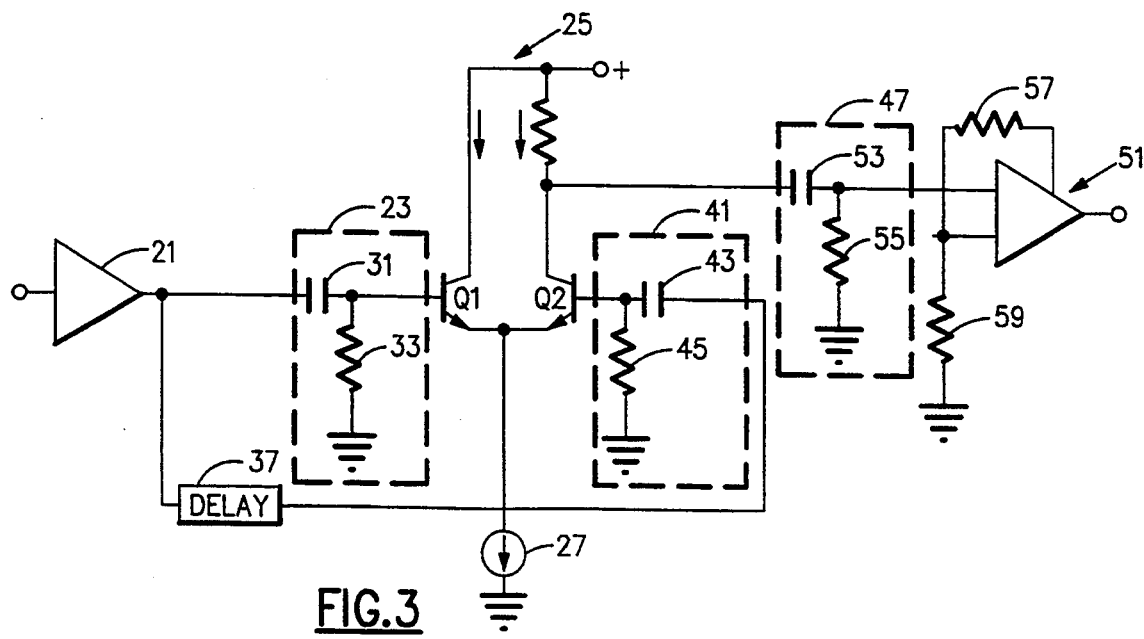
FIG. 3 is a part schematic, part block diagram representation of an AC-coupled fiber optic receiver in accordance with the present invention.

Referring now to FIG. 3, an AC-coupled fiber optic receiver in accordance with the present invention is shown. A preamplifier 21 receives an optical signal which is a digitally encoded analog signal, converts it to electrical form, amplifies it as an analog signal and provides a voltage signal output. The output of preamplifier 21 is connected through an AC coupling network 23 to one input of a differential amplifier 25 with a constant current emitter source 27. The differential amplifier includes npn transistors Q1 and Q2. The coupling network comprises a capacitor 31 and a resistor 33 with capacitor 31 connected between the output of preamplifier 21 and the base of transistor Q1 and resistor 33 connected between the base of transistor Q1 and ground. The emitter of transistor Q1 is connected to the emitter of transistor Q2 and to constant current source 27. The collector of transistor Q1 is connected to a power source and through a resistor 35 to the collector of transistor Q2. The output of preamplifier 21 is also connected to the input of a delay circuit 37 which can comprise a delay line or serial connected amplifiers with an overall gain of one. A delay line has less temperature sensitivity while the serial circuits are easier to implement. The output of delay circuit 37 is connected through an AC coupling network 41 to the base of transistor Q2. The coupling network 41 comprises a capacitor 43 connected between the output of the preamplifier and the base of transistor Q2 and a resistor 45 connected between the base of transistor Q2 and ground. The collector of Q2 is connected through an AC coupling network 47 to one input of a comparator 51. AC coupling network 47 comprises a capacitor 53 and a resistor 55. Capacitor 53 is connected between the collector of transistor Q2 and one input of comparator 51. The other input to comparator 51 is provided by a feedback signal through a resistor 57. A resistor 59 connects the other input of comparator 51 to ground.

In operation, an analog optical signal, which is digitally coded, is connected to preamplifier 21. Preamplifier 21 includes a semiconductor detector which can be a semiconductor photodiode or photodetector which provides weak current signals which are amplified and converted to voltage signals. The output of the preamplifier is connected through AC coupling network 23 to one input of the differential amplifier 25 and delayed version of the voltage signal from the preamplifier is connected through AC coupling network to the other input of differential amplifier 25.

The delay time of delay circuit is selected based on the baud time which is defined as the shortest time between any two transitions of the digitally coded signal, if the delay is too great pulse width distortion occurs and if the delay is too short signal amplitude is decreased which decreases the signal to noise ratio. The differential amplifier has the current source to limit the gain of the differential amplifier. The RC time constants of the AC coupling networks are selected to be long relative to the baud time. The output of the differential amplifier can be connected directly to comparator without using as AC coupling network if the comparator is adjusted to distinguish between voltages above and below the average output voltage of the differential amplifier.

Figure 4A:
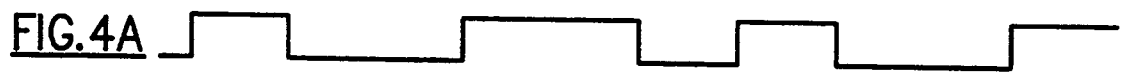
FIGS. 4A, 4B, and 4C are voltage waveform diagrams on a common time scale of the expected signals at the output of the preamplifier, the output of the delay circuit and the output of the differential amplifier, respectively, of FIG. 3.
Figure 4B:
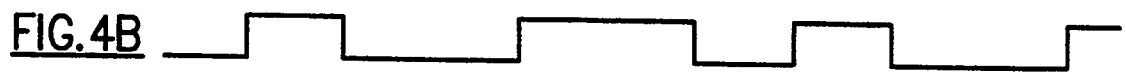
Figure 4C:

As illustrated by FIGS. 4A, 4B, and 4C, which correspond to the signals to be fed through the AC coupling networks to the bases of Q1 and Q2, and the output of the differential amplifier, respectively. When the base of Q1 and Q2, which are the inputs to the differential amplifier, are at the same potential, Q1 and Q2 share current I, provided by current source, equally. When the base of Q1 is more positive than the base of Q2, Q2 has less collector current than Q1. When the base of Q2 is more positive than the base of Q1, Q1 has less collector current than Q2.

When the current I is limited, the circuit also acts as an output voltage limiter. This allows a greater dynamic range for the preamplifier and thus a greater optical dynamic range at the input.

Equal signals at the bases of transistors Q1 and Q2 are called "common mode" signals and produce no differential currents in Q1 and Q2. If the time constant of the AC coupling network is much longer than the signal frequency cycle time, and the delay provided by delay circuit is small compared to the frequency cycle time, low frequency variations at the inputs of the differential amplifier will be identical. Since the output of the differential amplifier is the difference between the input signals, the low frequency variations will not appear at the output of the differential amplifier. If the time constant of the AC coupling network is long with respect to the signal baud time, and if the delay is short with respect to the baud time the differential amplifier produces a signal similar to passive differentiation. In receivers that use passive differentiation, the high pass filter that differentiates the signal limits the lower bound of the receiver's noise bandwidth. In the present invention, the lower frequency of the AC coupling network does not limit the noise bandwidth as much as a differentiator would, but the delayed input to the differential amplifier has the effect of cancelling low frequency noise. This cancellation also limits the lower end of the noise bandwidth.

In a receiver receiving optical signals with a rise and fall times of 3 nanoseconds, which is typical for a light emitting diode, and a baud time of 10 nanoseconds, and the delay time would be on the order of 2 nanoseconds. With the most desirable delay for a particular situation obtained taking into account that as the delay becomes shorter more noise cancellation results and as the delay becomes longer the amplitude of the detected signal increases.

Figure 5:
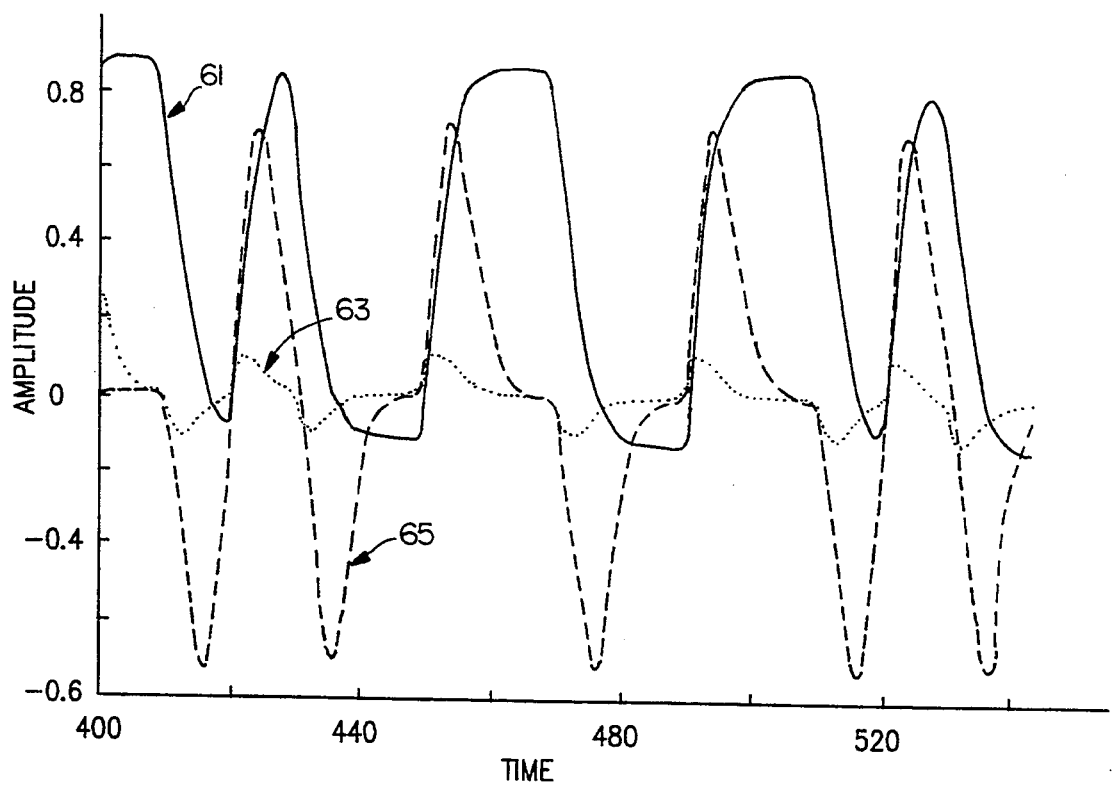
FIG. 5 is a graph of three waveforms showing the output waveform of a preamplifier, the output waveform of a passive differentiator operating on the output of the preamplifier and the output waveform of a differential amplifier receiving the output of the preamplifier at one input and a delayed output of the preamplifier at the other input, all plotted on common axes of normalized amplitude versus time.

Referring now to FIG. 5, a computer simulation of the output of preamplifier 11 or 21, indicated by reference numeral 61, the voltage signal provided to the comparator in the prior art circuit of FIG. 1 indicated by reference numeral 63, and the voltage signal provided to the comparator in the present invention indicated by reference numeral 65, are shown superimposed upon one another and plotted as a function of a normalized amplitude versus time measured in nanoseconds.

With a high frequency cutoff equal to a receiver design of the prior art, there is a significant improvement in the signal to noise ratio at the input to the comparator. This is due partly to the noise cancellation and partly to a significantly larger signal at the comparator with the same magnitude optical input.

In AC-coupled receivers, the resulting series of positive and negative pulses supplied to the comparator must decay to near zero before the next pulse. If this were not true, there would be pulse width distortion caused by various data patterns. This requirement causes even lower pulse amplitudes in the prior art to ensure that the signals decay to near zero.

The foregoing has described an AC-coupled fiber optic receiver that does not require a preamble before the data to be processed and that is easy to use with any two-level data format independent of the time between digital signal transitions.

While the invention has been particularly shown and described with reference to a preferred embodiment thereof, it will be understood by those skilled in the art that various changes in form and details may be made therein without departing from the spirit and scope of the invention.

I claim:

1. An AC-coupled receiver for extracting a digital signal from a digitally encoded analog signal comprising:
   first and second AC coupling networks characterized by corresponding time constants which are long relative to a baud time of the analog signal;
   delay means electrically coupled to the analog signal for providing a delayed analog signal, the delay time being short relative to the baud time of the analog signal;
   a differential amplifier having a first and second input, said first AC coupling network electrically coupling the analog signal to the first input of said differential amplifier, said second AC coupling network electrically coupling the output of said delay means to the second input of said differential amplifier; and
   comparator means electrically coupled to the output of the differential amplifier for providing a digital signal.

2. The AC-coupled receiver of claim 1 wherein said differential amplifier comprises a pair of bipolar transistors and includes a current source coupled to both emitters.

3. The AC-coupled receiver of claim 1 further comprising a third AC coupling network electrically connected to said comparator means and to the output of said differential amplifier.

4. The AC-coupled receiver of claim 1 wherein said analog signal is derived from a digitally encoded optical signal.

5. An AC-coupled fiber optic receiver comprising:
   preamplifier means electrically coupled to a fiber optic signal and providing an analog voltage signal representation of the optical signal;
   first and second AC coupling networks characterized by corresponding time constants which are long relative to a baud time of the fiber optic signal;
   delay means electrically coupled to the analog voltage signal for providing a delayed analog voltage signal, the delay time being short relative to the baud time of the fiber optic signal;
   a differential amplifier having a first and second input, said first AC coupling network electrically coupling the analog voltage signal to the first input of said differential amplifier, said second AC coupling network electrically coupling the output of the delay means to the second input of said differential amplifier; and
   comparator means electrically coupled to the output of said differential amplifier for providing a digital signal.

6. The AC-coupled fiber optic receiver of claim 5 wherein said differential amplifier comprises a pair of bipolar transistors and includes a current source coupled to both emitters of said bipolar transistors.

7. The AC-coupled fiber optic receiver of claim 5 further comprising a third AC coupling network electrically connected to said comparator means and to the output of said differential amplifier.

* * * * *